United States Patent
Alsharaeh et al.

(10) Patent No.: US 12,478,590 B2
(45) Date of Patent: Nov. 25, 2025

(54) IN SITU METHOD OF MAKING POROUS 2D BASED TRI-NANOCOMPOSITE FOR USE IN MEDICAL TREATMENT

(71) Applicant: Alfaisal University, Riyadh (SA)

(72) Inventors: Edreese H Alsharaeh, Riyadh (SA); Anoud Abdulrahman Alkhayal, Riyadh (SA)

(73) Assignee: Alfaisal University, Riyadh (SA)

( * ) Notice: Subject to any disclaimer, the term of this patent is extended or adjusted under 35 U.S.C. 154(b) by 429 days.

(21) Appl. No.: 18/085,433

(22) Filed: Dec. 20, 2022

(65) Prior Publication Data

US 2024/0207197 A1   Jun. 27, 2024

(51) Int. Cl.
*A61K 33/26* (2006.01)
*A61K 9/00* (2006.01)
*A61K 9/70* (2006.01)
*A61K 33/242* (2019.01)
*A61K 41/00* (2020.01)
*A61N 2/00* (2006.01)
*A61N 5/067* (2006.01)

(52) U.S. Cl.
CPC .......... *A61K 9/7007* (2013.01); *A61K 9/0009* (2013.01); *A61K 33/242* (2019.01); *A61K 33/26* (2013.01); *A61K 41/0052* (2013.01); *A61N 2/002* (2013.01); *A61N 2/004* (2013.01); *A61N 5/067* (2021.08)

(58) Field of Classification Search
CPC .... A61K 9/7007; A61K 33/242; A61K 33/26; A61K 41/0052; A61N 2/002
See application file for complete search history.

(56) References Cited

FOREIGN PATENT DOCUMENTS

CN   106554009 A  *  4/2017

OTHER PUBLICATIONS

Xiaodong Chen, et al.; Mechanism of Oxidation of Graphite to Graphene Oxide by the Hummers Method; ACS Omega; 2022, 7, 27, 23503-23510; Jun. 28, 2022 (Year: 2022).*
Mahcine Translation of CN 106554009 A (Year: 2017).*
Li-lai Liu, et al.; Few-layer Graphene Prepared Via Microwave Digestion Reduction and its Electrochemical Performances in Lithium Ion Batteries; International Journal of Electrochemical Science; 10 (2015) 1582-1594; Dec. 30, 2014 (Year: 2014).*
Jha et al. Triple nanocomposites of CoMn2O4, Co3O4 and reduced graphene oxide for oxidation of aromatic alcohols, Catal. Sci. Technol., 2014, vol. 4, pp. 1771-1779 (Year: 2014).*
Xiong et al. Reduced graphene oxide/hydroxylated styrene-butadiene-styrene tri-block copolymer electroconductive nanocomposites: Preparation and properties, Mater. Sci. Engineering B, vol. 177 (2012), pp. 1163-1169. (Year: 2012).*

* cited by examiner

*Primary Examiner* — James H Alstrum-Acevedo
(74) *Attorney, Agent, or Firm* — Geeta Kadambi; RIDDHI IP LLC

(57) ABSTRACT

A novel nanocomposite made of superparamagnetic nanoparticles, gold nanoparticles and reduced graphene oxide porous nanosheets is synthesized. The novelty of the nanocomposite lies in three main factors: the porosity of the reduced graphene oxide sheet, the magnetization of the superparamagnetic nanoparticles and the biocompatibility and near infrared absorbance of the gold nanoparticles all in one nanocomposite that does not disassemble when administered in the body. All of which are joined to create a whole and singular nanocomposite that can emit heat due to magnetic energy, become as biocompatible as possible and conceivably allow for near infrared absorbance penetration while the nanocomposite is fully assembled.

8 Claims, 4 Drawing Sheets

IN SITU METHOD OF MAKING POROUS 2D BASED TRI-NANOCOMPOSITE FOR USE IN MEDICAL TREATMENT

FIELD OF TECHNOLOGY

The present disclosure relates to an in-situ preparation and the method of making of porous 2D based tri-nanocomposites comprised of superparamagnetic nanoparticle (SPION), gold nanoparticle (AuNP) and reduced graphene oxide (RGO) sheet capable of being incorporated in the body without disassembling, thus having multiple effects in one nanocomposite simultaneously.

BACKGROUND

Magnetic hyperthermia and Near Infrared (NIR) laser therapy are widely known in the nanomedicine community as they are methods applied for diminishing cancerous tumor cells with little to no harm to healthy cells by means of an AMF (alternating magnetic fields) or NIR laser within the tumor site with high precision (Torres et al., 2019)(Fu et al., 2017). In our previous research, cubic superparamagnetic nanoparticles (SPIONs) that ranged in size from 15 nm to 30 nm have been synthesized for cancer treatment via magnetic hyperthermia therapy which resulted in efficient heating effects. Though, a downside to this research was the possibility of disassembly of the nanocomposite which might have caused heat fluctuations during testing as well as iron oxide leaching into the bloodstream. Therefore, to combat the issue of disassembly and to possibly create a superior nanocomposite that would be able to achieve higher heating effects while in one piece, core-shell nanoparticles are considered (Alkhayal et al., 2021).

Nanomedicine and nanotechnology are fields of science that have created a rise in medical technologies, chemistry and biomedical engineering amongst others. A scientific rise as the above-mentioned is bound to create novel materials as it is in its beginning stages of development (Kumar et al., 2020). One of the main issues we have in modern nanomedicine is the disassembly of nanocarriers in the bloodstream which may cause several unwanted side-effects. The creation of core-shell nanocomposites was and still is a method to achieve maximum effects of the nanocarrier in the body with minimal disassembly. Core-shell nanocomposites are a well-known, extremely effective method of merging more than one effect into one; an example of such would be drug delivery along with magnetic hyperthermia. In order to achieve controlled and targeted nanocarriers that can accomplish certain physiochemical effects, a nanocomposite with high surface area and simple functionalization should be created. Furthermore, a highly desired factor would be an effective structure-property relationship (Kumar et al., 2020).

Although core-shell nanoparticles seem astonishing at first glance due to their superior properties when comparing with other nanocomposites. The recreation of conventional core-shell nanoparticles exhibits various disadvantages including encapsulation efficiency, particle size control, thickness of shell and the fact that it is extremely time-consuming. Ultimately, not allowing mass-production of the core-shell nanocomposite (Galogahi et al., 2020). This research aims to diminish this issue by creating an RGO/$Fe_3O_4$/Au (Reduced Graphene Oxide/Iron Oxide/Gold) nanocomposite with the same pronounced qualities while allowing for ease of fabrication and thus, mass production. There is a need to find a nanoparticle that has superior physical and chemical properties and is compatible for administering for cancer patients who have to undergo multiple treatments.

SUMMARY

The present disclosure describes in-situ preparation and the method of making of porous 2D based tri-nanocomposites comprised of superparamagnetic Fe3O4, AuNPs and RGO sheet via microwave assisted method for cancer dual treatment via magnetic and photohyperthermia therapy. In one embodiment, a method of making of a porous 2D based tri-nanocomposite comprised of superparamagnetic $Fe_3O_4$, AuNPs and RGO sheet is described. In one embodiment, the porous 2D based tri-nanocomposite when incorporated in the body does not disassemble and the attached drug is delivered to the specific region. The novelty and advantage of this invention would be the prevention of disassembling of the tri nanocomposites into the bloodstream as well as the synergy of combining three nanomaterials into one nanocomposite. In another embodiment, porous 2D based tri-nanocomposite is used for treating a mammal in magnetic hyperthermia therapy for cancer treatment and drug delivery, where the nanocomposite can fully reside in the tumor and begin the destruction of cancer call without harming healthy tissue.

The presence of holes within the nanocomposite allows for more attachment which then leads to more $Fe_3O_4$ and Au NPs to attach; thus, allowing for a more concentrated effect. These holes also create areas where drugs can be attached and utilized within the nanocomposite as a means of a dual treatment. This invention would create numerous possibilities where it can be used for drug delivery, magnetic hyperthermia, NIR laser therapy, as a catalyst and energy storage.

The method of making the nanocomposite and using the tri materials disclosed herein may be implemented in any means for achieving various aspects, and may be executed to be used for various therapeutic applications. Other features will be apparent from the accompanying drawings and from the detailed description that follows.

BRIEF DESCRIPTION OF FIGURES

Example embodiments are illustrated by way of example and no limitation in the accompanying figures and tables, like references indicate similar elements and in which.

Other features of the present embodiments will be apparent from the accompanying drawings and from the detailed description that follows.

DETAILED DESCRIPTION

In the instant invention the preparation of the nanocomposite an RGO/$Fe_3O_4$/Au (Reduced Graphene Oxide/Iron Oxide/Gold) nanocomposite with the same pronounced qualities while allowing for ease of fabrication and thus, mass production, characterization and evaluation of the Structural, morphological, and optical properties is described. An ongoing issue in the drug delivery world where there is always a possibility that the nanocomposite may disassemble within the blood stream, not reaching the intended site fully. That is why higher doses of the drugs are administered to justify the loss of parts of it in the blood stream.

Figure 1:
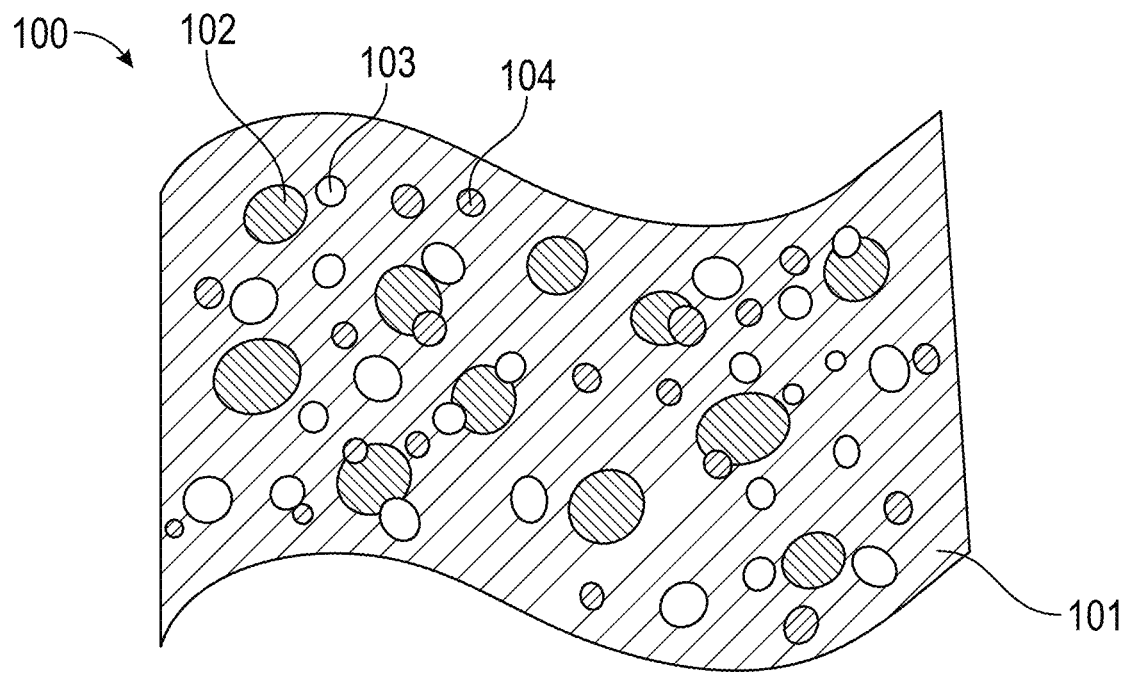
FIG. 1: shows illustration of the holey tri-composite nano-system showing the RGO nanosheet, SPIONs, AuNPs and the pores in the sheet itself.

The nanocomposite mainly focused on in this research is a holey (porous) RGO sheet that has a number of SPIONs and AuNPs strongly attached to it as shown in FIG. 1. The purpose behind this specific design lies in several aspects including its small size considering its high surface area, ease of functionalization due to the pores, and to eliminate disassembly within the human body. Based on research on porous carbon nanosheets, it is stated that 2D carbon nanosheets possess unique properties on their own. However, combining their effects with sheet porosity has unlocked a new area of discovery and novelty (He et al., 2019). $Fe_3O_4$ is the superparamagnetic component in the system. It is the essence of magnetic hyperthermia therapy, where an alternating magnetic field placed on the nanocomposite would cause it to heat up and eventually cause cancer cell death before harming healthy tissue. The role of Au in this nanocomposite is mainly in two areas: biocompatibility and a medium for near infrared (NIR) laser treatment as a joined method with magnetic hyperthermia. Lastly, the RGO holey nanosheet is the vessel in which the previously mentioned components will be bonded with. The holes in this nanocomposite essentially serve in creating more bonding areas for $Fe_3O_4$ and Au to reside as well as to allow for smooth transportation in the body. These holes/pores also create areas where drugs can be attached and utilized within the nanocomposite as a means of a dual treatment.

This novel invention claims the multi-use nature of a holey tri-composite nano-system which can simultaneously be used as a magnetic hyperthermia and NIR laser therapy vector while being bonded together as a unit.

Experimental Methods: The materials used in the synthesis of $Fe_3O_4$ were; Iron(III) Chloride ($FeCl_3$)—reagent grade 97%, Hydrazine Hydrate ($N_2H_4$)—80% and MilliQ $H_2O$. RGO synthesis included the use of Graphite fine powder—extra pure, Sulfuric acid ($H_2SO_4$)—95%, Sodium Nitrate PRS ($NaNO_3$), Potassium Permanganate ($KMnO_4$)—extra pure, Hydrogen Peroxide ($H_2O_2$)—30% and Hydrochloric acid (HCl)—37%. The synthesis of AuNPs required gold chloride salt solution ($HAuCl_4$) as a precursor to AuNPs.

Materials were purchased from Sigma Aldrich, Merck and Loba Chemie and were used without any purification. The $Fe_3O_4$ graphene nanocomposites were prepared by microwave hydrothermal synthesis in CEM Mars 6 microwave under varying conditions of concentration, pressure, temperature, power and time. The synthesis procedures are given below.

Synthesis of RGO nanosheets: The modified Hummer's method is used to obtain reduced graphene oxide (RGO) in large quantities. The main outline of this method revolves around oxidation and exfoliation of graphite to graphene oxide (GO) which is then reduced to give reduced graphene oxide (RGO). This procedure began by cooling down 125 ml of 95% Sulfuric Acid-$H_2SO_4$ in an ice bath on a stirrer along with a stirring magnet (20 min wait)(cooled sulfuric acid). The addition of 2 g Graphite into the acid in small quantities at a time followed (graphite-sulfuric acid mix). Then after 20 min, 2.5 g of grinded Sodium Nitrate—$NaNO_3$ was added gradually and mixed for 15 min (graphite-sulfuric acid-sodium nitrate mix). The final step was the addition of 20 g of Potassium permanganate—$KMnO_4$ very slowly, all the while stirring in the ice bath (graphite-sulfuric acid-sodium nitrate-potassium permanganate mix). After 20 mins, the mixture was heated up to (32-40° C.) for 2 hrs with vigorous stirring (the color changed from black to dark green). The temperature was kept below 50° C. while adding 230 ml of MilliQ $H_2O$, by placing it back on an ice bath and stirring. After 20 mins, a slow addition of 20 ml of 30% Hydrogen Peroxide—$H_2O_2$ caused the mixture to change to a yellow color. Hydrogen Chloride—HCl was added (100 ml=10 ml HCl+90 ml MilliQ $H_2O$). The mixture was washed with hot MilliQ $H_2O$ in the centrifuge (graphene oxide). The washing process went on until the pH of GO was completely neutral. Sonication of the sample was done for 5 mins at power 6 (reduced graphene oxide nanosheet). The reduced graphene oxide nanosheet was then dried at 60° C. overnight. Every temperature mentioned is specific to each step.

Synthesis of RGO-Fe—Au (8:1:1): The objective of this research is to create SPIONs on sheets of holey RGO (otherwise known as porous RGO sheets) anchored by AuNPs. The intention of having an RGO sheet become the ground on which SPIONs and AuNPs reside gave the conclusion of an 8:1:1 ratio of RGO:SPIONs:AuNPs. Five processes of synthesis are required to achieve maximum porosity as well as to further decrease the size of the nanoparticles amongst other factors. The aim behind every step will be further detailed in upcoming sections. The following processes will be defined, where the third process is two options of synthesis that we will be choosing between. Samples are characterized and analyzed through XRD, TEM, and UV-Vis in order visualize and understand the quality of the nanocomposite.

Before Calcination: The first step in this process has been labelled "Before Calcination" where the product is at its most initial phase. This phase will show where alterations need to be made. The main goal is to obtain small sized, biocompatible nanocomposites that have high magnetization as well as high porosity in order to have the ability to load drugs as well as to be used in magnetic hyperthermia amongst other treatment options. A Microwave (MW) Hydrothermal method has been employed as the main synthesis method where optimization of MW power, reaction time, temperature and the volume of the sample can create SPION-containing nanocomposites in the desired form. This method is extremely beneficial as it gives reproducible results and ensures the same nanocomposite properties (Kremsner & Stadler, 2013). Firstly specific concentrations and volumes of individual ingredients were added, wherein the specific concentrations and volumes are 40 ml of RGO (2:1, RGO:$H_2O$) is added to a CEM vessel followed by 5.2 ml of Iron Chloride III $FeCl_3$ (dissolved in distilled $H_2O$) and 2.9 ml Hydrogen Tetrachloroaurate ($HAuCl_4$).

Next, the addition of 0.32 ml Hydrazine Hydrate $N_2H_4$ leading up to the last step which is placing the sample in the CEM MARS™ 6 device (The MARS™ 6 is a microwave acid digestion system that produces clear digestate from CEM) with the following specific parameters: specific temperature 200° C., specific pressure 250 psi, specific time 10 mins, specific power 900 W. All calculations to obtain the abovementioned numbers are listed in (Table 1).

TABLE 1

| | Calculations: | |
|---|---|---|
| RGO | 80 mg RGO = 2:1 RGO:$H_2O$ → 40 ml RGO solution | This stock solution has been used in previous research and has proven efficient in this case. |
| AuNPs | 0.01M × 196.97 g/L = 1.969 mg/ml → 5.07 ml | 0.01M refers to an Au stock solution. Molecular weight of $HAuCl_4$ = 339.785 g/mol. |
| $Fe_3O_4$ | 0.07M × 55.845 g/L = 3.91 mg/ml | Molecular weight of Au = 196.69. In order to ensure 10 mg of the particles in the $HAuCl_4$ solution are utilized, 10 mg is divided by 1.969 mg/ml to equal 5.07 ml. (Meaning, 5.07 ml of 0.01M of $HAuCl_4$ has 10 mg of Au particles). 0.07M stock solution. Molecular weight of $FeCl_3$ = 162.2 g/mol |
| $N_2H_4$ | $\frac{2.56 \text{ ml}}{8 \text{ ml}} = 0.32$ ml = 320 µl | Molecular weight of Fe = 55.845 In order to ensure 10 mg of Fe particles in the $FeCl_3$ solution are utilized, 10 mg is divided by 3.91 mg/ml to equal 2.557 ml. Meaning, 2.557 ml of 0.07M $FeCl_3$ has 10 mg of Fe particles. 0.32 ml |

The sample is removed from the CEM vessel, filtered using magnetic separation as well as filter paper separation in order to purify the SPION nanocomposite from any unwanted debris then placed in the over at 60° C. to dry overnight. The sample is then removed and characterized using XRD, UV and TEM.

After Calcination: After the sample SPION nanocomposite in the previous step (Before Calcination) has been dried and characterized, TGA (Thermogravimetric Analysis) is done in order to understand the stability of the nanocomposite under extreme heat conditions. The SPION nanocomposite was placed in a calcination chamber to reach 350° C. for 4 hours. The parameters of the calcination device were as follows: $T_1$=50 mins, $T_2$=4 hrs, Temperature=350° C. Good magnetization was observed after the calcined SPION nanocomposite was removed. Correspondingly, the calcined SPION nanocomposite was characterized using XRD, UV and TEM which allows for the next step in this optimization process.

After Acid Reflux (3A): The third optimization process is acid treatment. This process has been sectioned into two parts, the first is called "Acid Reflux" and the second is called "Acid CEM Treatment". Both of which are methods of subjecting the calcined SPION nanocomposite to highly acidic conditions in order to create a certain amount of porosity on the nanosheet as well as to ensure the attachment of the SPIONs and AuNPs to the RGO nanosheet. This process is done to compare previous steps in order to find the better solution. The process begins by adding 50 mg of the calcined SPIONs nanocomposite into a 3-necked flask. Next, 42 ml of distilled $H_2O$ is added. Lastly, 8 ml of Nitric Acid ($HNO_3$) follows. The mixed calcined SPIONs nanocomposite sample is then placed over a magnetic stirrer in order to heat the solution up to 70'C for 3 hrs. After that, the acid refluxed calcined SPIONs nanocomposite sample is filtered in order to clean out any remaining acid in the solution. Lastly, it is dried at 60° C. overnight and a portion of it is taken for XRD, UV and TEM characterization.

After CEM Acid Treatment (3B): In this section, we shed light on CEM Acid Treatment. The process begins by adding 50 mg of the calcined SPIONs nanocomposite into a CEM vessel, followed by 42 ml of distilled $H_2O$ as well as 8 ml of Nitric Acid ($HNO_3$). The calcined SPIONs nanocomposite is then locked in and placed in the CEM MAR6 chamber at the following specific parameters: Power=900 W, Pressure=250 psi, Temperature=200° C., and Time=20 mins. After the process if completed, the acid treated calcined SPIONs nanocomposite is filtered in order to ensure absence of acid residue. Finally, it is dried overnight at 60° C. and afterwards a portion of it is taken for XRD, UV and TEM characterization.

After Sonication (Final Product): Both acid refluxed calcined SPIONs nanocomposite and acid treated calcined SPIONs nanocomposite were sonicated for 6 hrs in order to ensure the separation of the holey RGO sheets as well as to finalize the process of holey RGO sheet encapsulation. Results showed that the acid reflux procedure has caused a noticeable loss in magnetization as proved by magnetic separation as well as XRD results where the Fe peak is not as prominent, thus proving less magnetization.

Characterization: The nanomaterials synthesized were characterized using X-ray diffraction (XRD) (Rigaku Miniflex™600), High resolution transmission electron microscopy (HR-TEM), and UV-Vis analysis (Perkin Elmer Lambda™ 25).

XRD: The diffraction peaks and their positions of the following graphs of the SPIONs are consistent with the standard XRD data for Magnetite, ($Fe_3O_4$)—(ICSD 00-001-1111); Gold, syn (ICSD 00-004-0784); Graphite (ICSD 00-008-0415). The planes for the diffraction peaks at 2θ of 35.24°, 37.83°, 44.04°, and 64.27° can be indexed as (3, 1, 1), (1, 1, 1), (1, 0, 1), (2, 0, 0) and (2, 2, 0) respectively. Based on size and crystallinity; the optimal synthesis parameters were 900 W, 250 psi, 200° C. and 10 mins.

Figure 2:
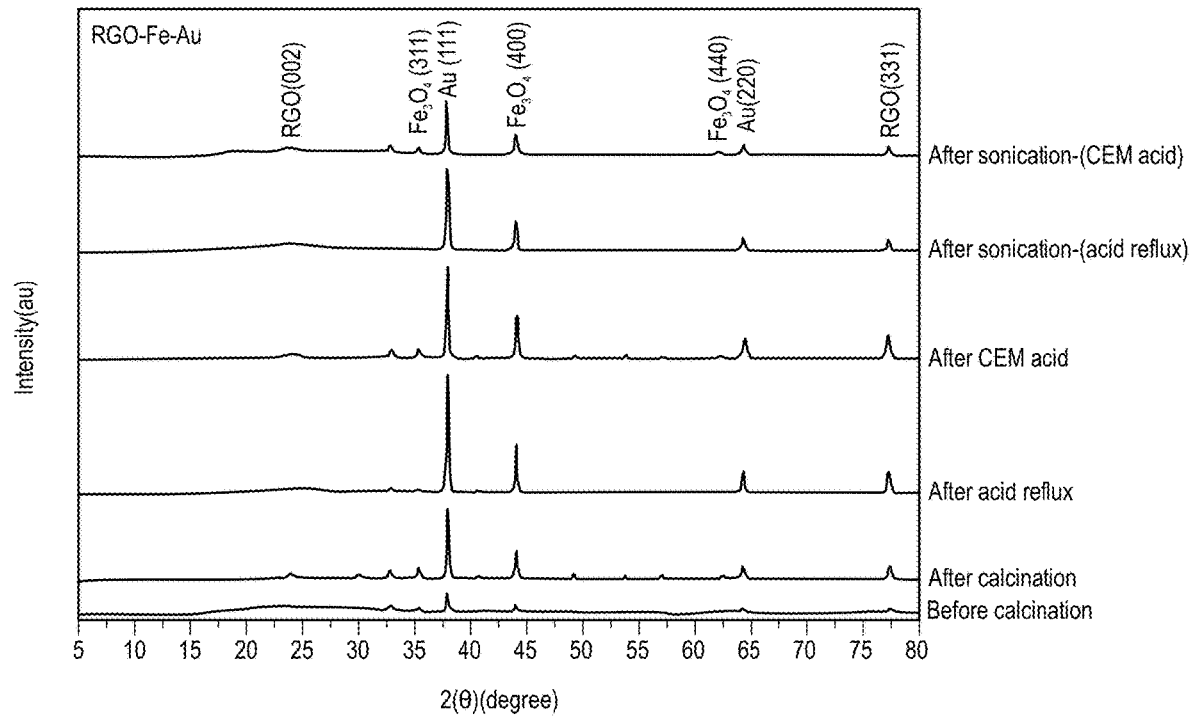
FIG. 2: Comparative XRD analysis for RGO/$Fe_3O_4$/Au nanocomposites for all five processes.
Figure 3:
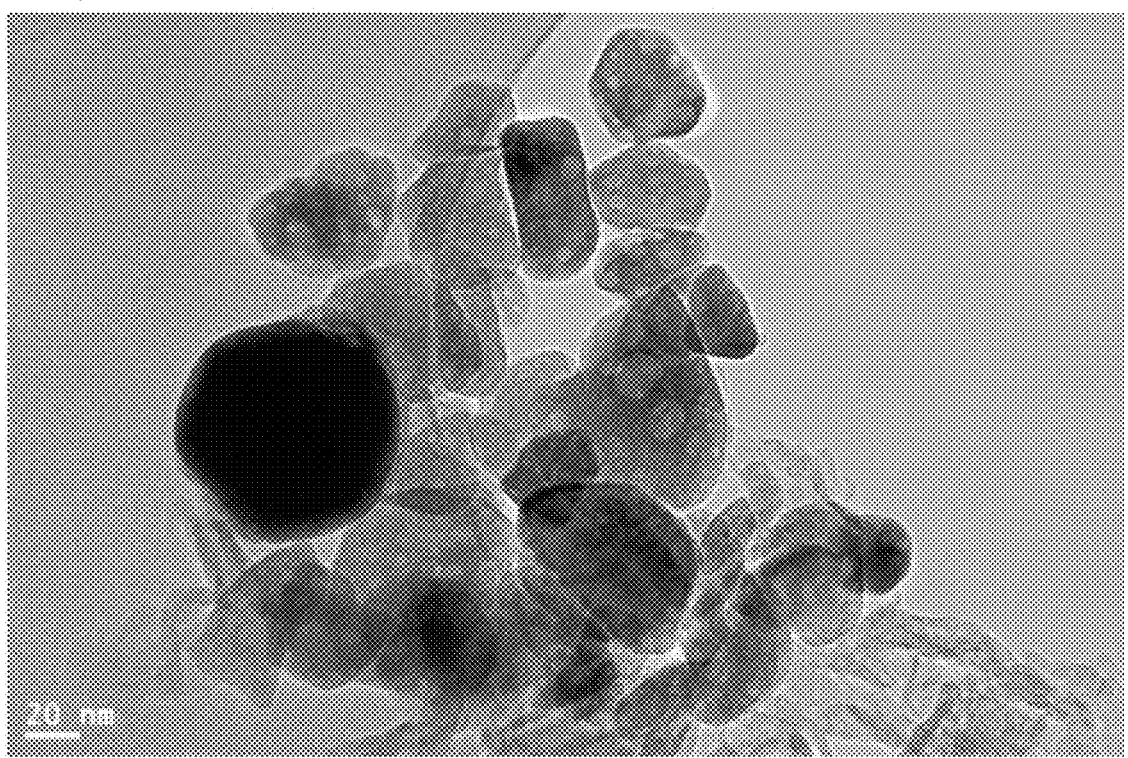
FIG. 3: HR-TEM image of RGO/$Fe_3O_4$/Au in its third phase labelled (3B): After CEM Acid showing highly porous RGO nanosheets as well as a dominant $Fe_3O_4$ nanoparticle at 20 nm.

After the analysis of FIG. 2, we notice the gold band is much higher and more prominent than the SPIONs, this gives much hope to the possibility of use in NIR laser treatment. Nonetheless, the fact that the Au band is higher does not influence the strength of magnetization of the samples. Moving forward, this graph shows us an extremely obvious difference between the acid reflux samples and the CEM acid samples labelled 3A-4A and 3B-4B that lies in the SPIONs content and strength, where the samples used in acid reflux show none or little signs of $Fe_3O_4$ in the sample as well as not showing any magnetization during magnetic separation methods in the lab.

Figure 4:
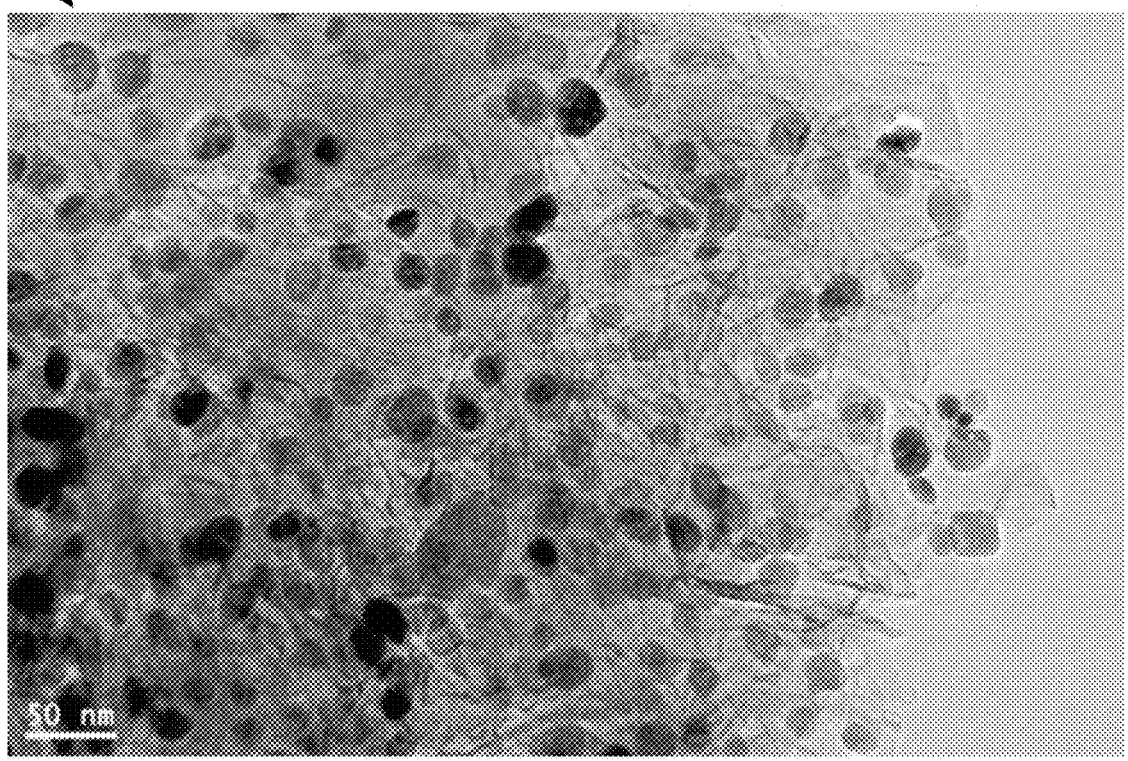
FIG. 4: HR-TEM image of RGO/$Fe_3O_4$/Au at 50 nm in its final phase labelled (4B): After sonication (CEM acid).

When analyzing FIG. 4, it is noticed that there is a difference in color, indicating the presence of both AuNPs as well as SPIONs embedded onto the RGO nanosheet. Moreover, the pores are obvious and are evenly distributed. What is interesting about the HR-TEM images above is the fact that the final phase (FIG. 4) has been through high intensities of heat, acidity and sonication while both AuNPs and SPIONs are perfectly intact and functional. Meaning, the SPIONs embedded on the sheets are magnetic and able to withstand AMF radiation while the AuNPs are able to give the nanocomposite the biocompatibility it needs as a safeguard in the body even if it is not yet functional for NIR therapy.

Figure 5:
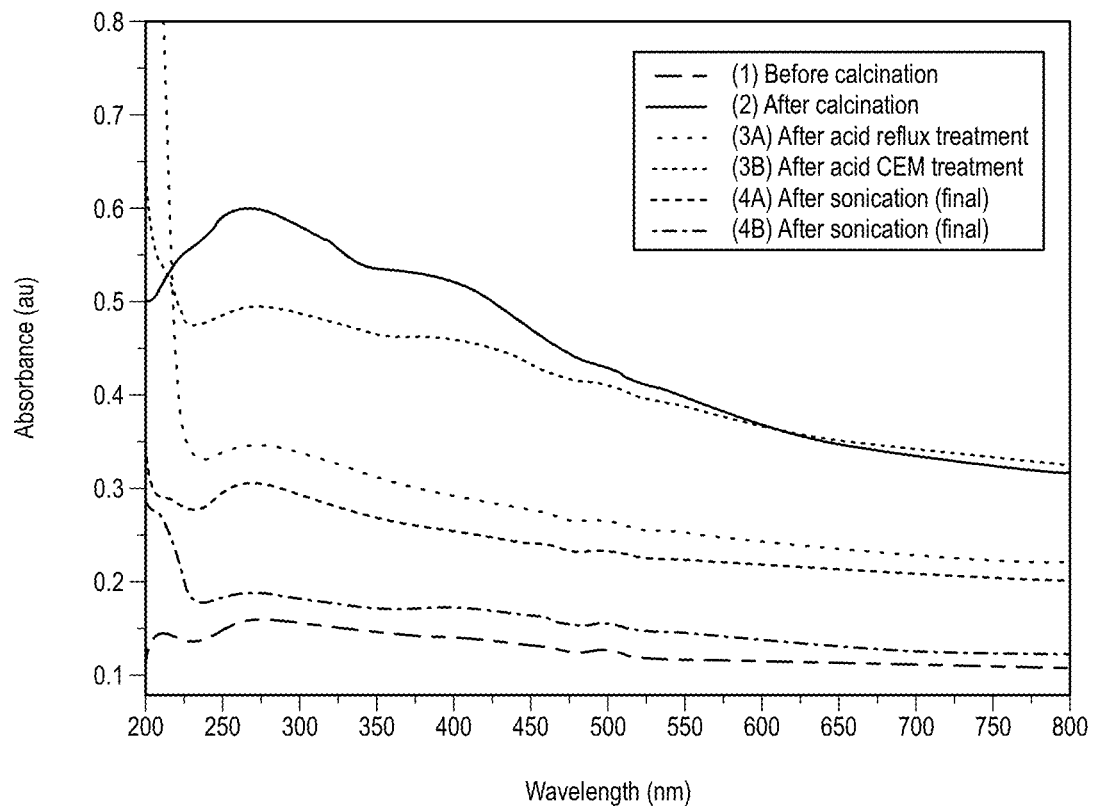
FIG. 5: UV-Vis profiles showing a comparison of the accumulative five process results.

In FIG. 5 the main concern is to understand AuNPs and their absorbance rate in this specific nanocomposite. The main concern in this UV graph is the absorbance rate of AuNPs at 800 nm for future NIR applications. After the analysis of all characterization methods including manual magnetic separation, it is concluded the samples are much better at controlling magnetization as well as pore creation within the RGO nanosheet and are thus the best outcome.

Conclusion and Future outlook: In conclusion, the RGO nanosheet in this work provides as a multifunctional vehicle of SPIONs, AuNPs and potentially drugs. The pores in the sheet serve as attachment sites which allows for a more concentrated effect as an advantage. Characterization of the nanocomposite shows promising results, and the reproducibility of the material is identical. XRD analysis clearly represented high intensities of the SPIONs, AuNPs and RGO nanosheets which indicates the high functionality of each. This scheme was devised in order to overcome the demerits of core-shell nanocomposites which have the disadvantage of difficult reproducibility as a main trait. HR-TEM results proved XRD results further and have shown great success in this product. This porous tri-nanocomposite will be further tested using FT-IR in order to spot the functional groups and which types of drugs are best suited for attachment and creating an attachment site for a drug for in-vivo therapy.

Furthermore, magnetic hyperthermia and NIR therapies will be tested as the main applications in the future. This will open a new opportunity to test the AuNPs and create smaller sizes in order to achieve 800 nm absorbance as suggested by literature for NIR laser therapy. The main goal has and will continue to be to treat cancer without the dependence on chemotherapeutic drugs. To the best of our knowledge, this work is the first to claim the multi-use nature of a porous tri-nanocomposite which can simultaneously be used as a magnetic hyperthermia and NIR laser therapy vector while being bonded together as a unit.

Advantages: The presence of holes within the porous tri-nanocomposite allows for more attachment which then leads to more $Fe_3O_4$ and Au NPs to attach; thus, allowing for a more concentrated effect. These holes also create areas where drugs can be attached and utilized within the porous tri-nanocomposite as a means of a dual treatment. To the best of our knowledge, this has always been an ongoing issue in the drug delivery world where there is always a possibility that the nanocomposite may disassemble within the blood stream, not reaching the intended site fully. That is why higher doses of the drugs are administered to justify the loss of parts of it in the blood stream. This invention would create numerous possibilities where it can be used for suitable drug to be used for drug delivery, magnetic hyperthermia, NIR laser therapy, and catalyst and energy storage.

INDUSTRIAL USE

There is a high possibility that this nanocomposite can be used for many other purposes other than what is stated in this disclosure.

What is claimed is:

1. A method of making a porous tri-nanocomposite, comprising:
    cooling 125 ml of 95% Sulfuric Acid—$H_2SO_4$ in an ice bath by stirring with a stirring magnet for 20 mins to obtain a cooled sulfuric acid;
    adding of 2 g Graphite into the acid in small quantities slowly to the cooled sulfuric acid for 20 mins to make a graphite-sulfuric acid mix;
    grinding of the graphite-sulfuric acid mix by adding 2.5 g of Sodium Nitrate was done for 15 mins to make a graphite-sulfuric acid-sodium nitrate mix;
    adding 20 g of Potassium permanganate to the above solution and stirred in the ice bath for 20 mins;
    heating the mix after adding Potassium permagnate to 32-40° C. with vigorous mixing for 2 hrs to make a graphite-sulfuric acid-sodium nitrate-potassium permanganate mix;
    slowly adding 230 ml filtered water and stirring the graphite-sulfuric acid-sodium nitrate-potassium permanganate mix and adding hydrogen peroxide to make a graphene oxide;
    centrifuging and washing of the graphene oxide with hot purified water till the pH of the graphene oxide was neutral;
    sonicating for 5 mins at power 6 to convert the graphene oxide to make a reduced grapheme oxide;
    drying the reduced graphene oxide nanosheet at 60° C. overnight;
    combining the reduced graphene oxide nanosheet (,) Iron (III) Chloride ($FeCl_3$), Hydrogen Tetrachloroaurate ($H[AuCl_4]$), Hydrazine Hydrate ($N_2H_4 \cdot H_2O$) and performing microwave acid digestion at a specific pressure, specific temperature, specific power and specific time to obtain a superparamagnetic nanoparticle nanocomposite;
    calcining the superparamagnetic nanoparticle nanocomposite to obtain a calcined superparamagnetic nanoparticle nanocomposite; and
    creating porosity in the calcined superparamagnetic nanoparticle nanocomposite by acid refluxing or using microwave digestion system for acid treatment to create the porous tri-nanocomposite.

2. The method of claim 1, wherein the specific temperature is 200° C. to perform the microwave acid digestion.

3. The method of claim 1, wherein the specific pressure is 250 psi to perform the microwave acid digestion.

4. The method of claim 1, wherein the specific time is 10 mins to perform the microwave acid digestion.

5. The method of claim 1, wherein the specific power is 900 W to perform the microwave acid digestion.

6. The method of claim 1, further comprising;
    Creating an attachment site for a drug for in-vivo therapy.

7. The method of claim 6, wherein the porous tri-nanocomposite is used in a magnetic hyperthermia and NIR laser therapy vector while being bonded together as a unit with a suitable drug.

8. The method of claim 7, wherein drugs can be attached and utilized within the porous tri-nanocomposite as a means of a dual treatment.

* * * * *